US012172437B2

(12) United States Patent
Tse et al.

(10) Patent No.: US 12,172,437 B2
(45) Date of Patent: Dec. 24, 2024

(54) MULTI-NOZZLE ELECTROHYDRODYNAMIC PRINTING WITH DIVERTERS

(71) Applicant: The Regents of the University of Michigan, Ann Arbor, MI (US)

(72) Inventors: Lai Yu Leo Tse, Ann Arbor, MI (US); Kira Barton, Ann Arbor, MI (US); Ethan John Mcmillan, Grand Haven, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 135 days.

(21) Appl. No.: 18/011,506

(22) PCT Filed: Jun. 18, 2021

(86) PCT No.: PCT/US2021/038103

§ 371 (c)(1),
(2) Date: Dec. 19, 2022

(87) PCT Pub. No.: WO2021/257998

PCT Pub. Date: Dec. 23, 2021

(65) Prior Publication Data

US 2023/0256737 A1 Aug. 17, 2023

Related U.S. Application Data

(60) Provisional application No. 63/040,721, filed on Jun. 18, 2020.

(51) Int. Cl.
*B41J 2/06* (2006.01)
*B41J 2/185* (2006.01)

(52) U.S. Cl.
CPC ................. *B41J 2/06* (2013.01); *B41J 2/185* (2013.01); *B41J 2002/062* (2013.01)

(58) Field of Classification Search
CPC ........ B41J 2/06; B41J 2/185; B41J 2002/062; B41J 2/02
See application file for complete search history.

(56) References Cited

U.S. PATENT DOCUMENTS

| | | | |
|---|---|---|---|
| 2010/0033543 A1 | 2/2010 | Piatt et al. | |
| 2011/0187778 A1 | 8/2011 | Boot et al. | |

(Continued)

FOREIGN PATENT DOCUMENTS

| | | |
|---|---|---|
| KR | 1020110061762 A | 6/2011 |
| KR | 1020140039590 A | 4/2014 |
| KR | 10-1939459 | 1/2019 |

OTHER PUBLICATIONS

Written Opinion corresponding to PCT/US2021/038103, Oct. 13, 2021, 4 pages.

(Continued)

*Primary Examiner* — Bradley W Thies
(74) *Attorney, Agent, or Firm* — Reising Ethington P.C.

(57) ABSTRACT

A printer includes a nozzle from which a stream of printing fluid is electrostatically extracted and directed toward a printing surface. A diverter can selectively interrupt the stream of printing fluid so that at least some of the extracted printing fluid is not deposited on the printing surface. Another stream of printing fluid can be extracted from another nozzle in a different direction from the first. Respective diverters can selectively and independently interrupt each stream of printing fluid to control which portions of the extracted fluids are deposited over the printing surface. Diverted printing fluid can be collected and reused. The diverters allow for a more constant or uniform extraction field while permitting selective deposition of ink droplets similar to drop-on-demand printing schemes.

20 Claims, 3 Drawing Sheets

(56) References Cited

U.S. PATENT DOCUMENTS

| | | | | |
|---|---|---|---|---|
| 2013/0249983 | A1 | 9/2013 | Marcus | |
| 2018/0304621 | A1* | 10/2018 | Byun | B41J 2/072 |
| 2019/0389222 | A1 | 12/2019 | Bonneton et al. | |

OTHER PUBLICATIONS

International Search Report corresponding to PCT/US2021/038103, Oct. 13, 2021, 9 pages.
Extended European Search Report corresponding to application 21825347.4, dated Jun. 27, 2024, 9 pages.

* cited by examiner

MULTI-NOZZLE ELECTROHYDRODYNAMIC PRINTING WITH DIVERTERS

TECHNICAL FIELD

The present disclosure relates generally to printing and, more particularly, to electrohydrodynamic printing.

BACKGROUND

Electrohydrodynamic printing, also known as e-jet printing, is a printing technique that relies on an electric field to extract droplets of a charged or polarized printing fluid from a printing nozzle. E-jet printing is capable of very high-resolution printing compared to other drop-on-demand printing methods with droplet size and spatial accuracy on a sub-micron or nanometer scale. Early e-jet printing was limited to electrically conductive printing surfaces because the printing surface was one of the electrodes between which the electric field was produced.

Consistency with the electric field was also problematic due to the deposited ink causing interference with the field as printing progressed. U.S. Pat. No. 9,415,590 to Barton, et al. addressed these and other problems via clever ink extraction and directing techniques that did not rely on a conductive printing surface. Other obstacles to larger-scale commercialization remain.

SUMMARY

In accordance with various embodiments, a printer includes a nozzle from which a stream of printing fluid is electrostatically extracted and directed toward a printing surface, and a diverter that selectively interrupts the stream of printing fluid such that at least some of the extracted printing fluid is not deposited on the printing surface.

In various embodiments, the diverter uses a jet of fluid to selectively divert printing fluid from the stream so that the diverted printing fluid is not deposited on the printing surface.

In various embodiments, the printer includes a collector into which the extracted and undeposited printing fluid is diverted.

In various embodiments, the printer is configured to produce intersecting first and second jets of fluid, wherein the first jet directs the stream of printing fluid toward the printing surface and the second jet is provided by the diverter.

In various embodiments, the printer includes a director nozzle and a diverter nozzle. The director nozzle provides a first jet of fluid to direct the stream of printing fluid toward the printing surface, and the diverter nozzle provides a second jet of fluid to selectively divert printing fluid from the stream of printing fluid. The stream of printing fluid is electrostatically extracted at a location between a discharge end of the director nozzle and a discharge end of the diverter nozzle.

In various embodiments, the nozzle is a first nozzle, the diverter is a first diverter, the stream of printing fluid is a first stream of printing fluid electrostatically extracted in a first direction toward a first extractor, and the printer includes a second nozzle and a second diverter. A second stream of printing fluid is electrostatically extracted from the second nozzle in a different second direction toward a second extractor and directed toward the printing surface. The second diverter selectively interrupts the second stream of printing fluid such that at least some of the printing fluid extracted from the second nozzle is not deposited on the printing surface.

In various embodiments, first and second diverters are independently controllable to permit printed patterns from each nozzle to be different without independent control of the electrostatic extraction of printing fluid from the first and second nozzles.

In various embodiments, first and second nozzles are located between first and second extractors with extraction openings of the first and second nozzles facing away from each other.

In various embodiments, first and second nozzles are a first pair of nozzles located between first and second extractors, and the printer includes a second pair of nozzles located between the second extractor and a third extractor such that one of the nozzles of each pair share the second extractor.

In various embodiments, a second extractor extends between a first pair and a second pair of nozzles and shields the pairs from each other.

In various embodiments, the nozzle is an ink nozzle, and the printer includes an extractor, a director nozzle, and a layer of electrically insulating material. The extractor is transversely spaced apart from the ink nozzle, and the director nozzle is between the ink nozzle and the extractor. The layer of electrically insulating material is disposed between the director nozzle and at least one of the ink nozzle and the extractor.

In accordance with various embodiments, a printer includes a first nozzle and a second nozzle from which respective streams of printing fluid are electrostatically extracted in different first and second directions and directed toward a printing surface.

In various embodiments, extraction openings of the first and second nozzles face away from each other.

In various embodiments, the printer includes a first extractor spaced from the first nozzle in the first direction and a second extractor spaced from the second nozzle in the second direction, such that the nozzles are between the extractors.

In various embodiments, the printer includes a diverter that selectively interrupts at least one of the streams of printing fluid such that at least some of the extracted printing fluid is not deposited on the printing surface.

In various embodiments, the printer includes a first diverter that selectively interrupts the stream of printing fluid from the first nozzle and a second diverter that selectively interrupts the stream of printing fluid from the second nozzle such that at least some of the extracted printing fluid is not deposited on the printing surface.

In various embodiments, the printer is configured to produce intersecting first and second jets of fluid. The first jet directs at least one of the streams of printing fluid toward the printing surface and the second jet diverts printing fluid from one of the streams of printing fluid such that at least some of the extracted printing fluid is not deposited on the printing surface.

In various embodiments, the first and second nozzles are a first pair of ink nozzles located between first and second extractors, and the printer includes a second pair of ink nozzles located between the second extractor and a third extractor such that one of the nozzles of each pair share the second extractor.

In various embodiments, the printer includes a first pair of director nozzles between first and second extractors and a second pair of director nozzles between the second extractor and a third extractor. The first pair of ink nozzles is between the nozzles of the first pair of director nozzles, and the second pair of ink nozzles is between the nozzles of the second pair of director nozzles. The printer also includes a first pair of diverter nozzles between the first and second extractor and a second pair of diverter nozzles between the second and third extractors. Each diverter nozzle is independently controllable to produce respective jets of fluid to selectively divert printing fluid from each of the respective streams of printing fluid.

In various embodiments, the nozzles are ink nozzles, and the printer includes an extractor transversely spaced apart from one of the ink nozzles, a director nozzle between the extractor and the spaced apart ink nozzle, and a layer of electrically insulating material disposed between the director nozzle and at least one of the spaced apart ink nozzle and the extractor.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF EMBODIMENTS

Figure 1:
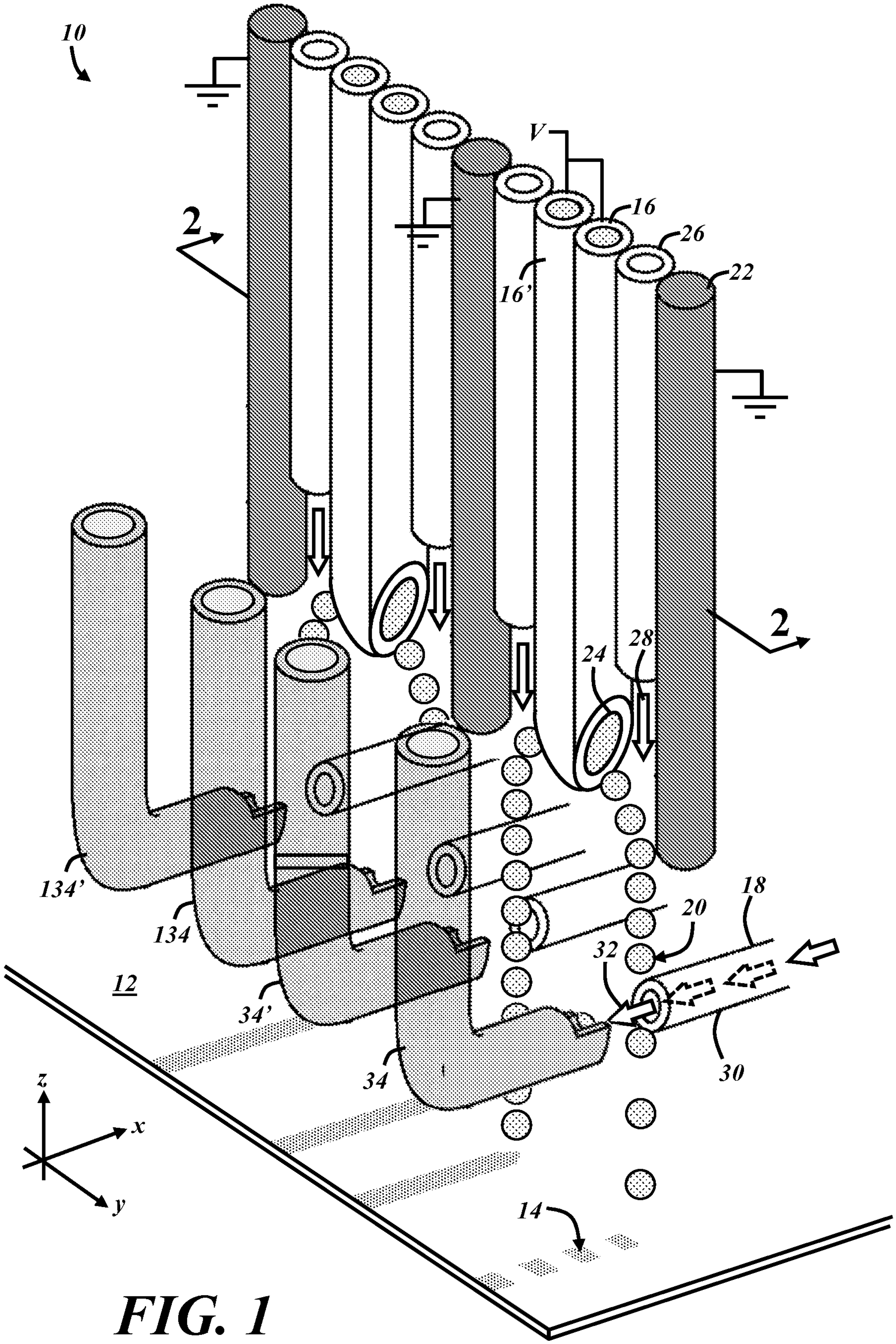
FIG. 1 is a schematic isometric view of a portion of a multi-nozzle electrohydrodynamic printer equipped with diverters.

FIG. 1 schematically illustrates an example of an electrohydrodynamic (i.e., e-jet) print head configured to extract printing fluid from multiple nozzles simultaneously while diverting some of the extracted printing fluid before it reaches a printing surface 12. The system enables control of a printed pattern 14 without the need to individually address the various ink nozzles in the typical drop-on-demand manner. Since the electrostatic fields associated with the various nozzles can be applied simultaneously—e.g., continuously or at the same pulse frequency—the effects of crosstalk among the nozzles are virtually eliminated. In other words, even though the electrostatic extraction fields associated with adjacent nozzles may interfere with one another to some extent, the interference can be made constant rather than variable.

The print head 10 includes one or more ink nozzles 16 and an associated diverter 18. A stream 20 of printing fluid is extracted electrostatically from each nozzle 16 and directed toward the printing surface 12. Printing fluid is extracted via the presence of an extractor 22, which is laterally spaced (in the direction of the y-axis in FIG. 1) from the nozzle 16. When a voltage potential is applied across the nozzle 16 and extractor 22, an electrostatic field is generated therebetween. In this example, the extractor 22 is at electrical ground while the nozzle 16 has an applied voltage (V). The charged printing fluid is attracted to the differently charged extractor 22 and is extracted from the nozzle 16 through an extraction opening 24 of the nozzle.

Extracted printing fluid is directed toward the printing surface 12, at least in part, by a directionality field. In this example, the directionality field is a fluid flow field, a least a portion of which is located between the nozzle 16 and the extractor 22. The flow field may be a gas flow field generated by a director nozzle 26 that emits a jet of gas 28 in a direction toward the printing surface 12 (the direction of the z-axis in FIG. 1). The printing fluid travels in this directionality field toward the printing surface 12, and the stream 20 of printing fluid is thereby directed toward the printing surface. Other types of directionality fields are possible, such as electrostatic directionality fields as disclosed in the above-mentioned patent to Barton, et al. The directionality field can be in the form of a flowing fluid other than a gas, such as a low boiling point liquid. Such a liquid can be selected to be compatible with the printing fluid being directed toward the printing surface. For example, the printing fluid may include an organic solvent that evaporates after deposition on the printing surface, and the director nozzle 26 may emit a stream or jet of the organic solvent to form the directionality field. The solvent from the director nozzle 26 directs the stream 20 of printing fluid toward the printing surface. But most or all of the solvent from the director nozzle 26 evaporates on its way to the printing surface 12 such that the printing fluid is not significantly diluted compared to its original composition at the nozzle 16. As such, the physical state of the director fluid could vary along the length (in the z-direction in the figures) of the directionality field—i.e., being in a liquid state at the director nozzle 26, in a gaseous state at the printing surface 12, and a gas/liquid mixture between the director nozzle and the printing surface.

As used herein, a stream 20 of printing fluid may be a continuous jet of printing fluid or a series of individual droplets, as in FIG. 1. An ink or printing fluid is any fluid that flows under pressure and can be solidified after deposition. Solidification can be via various mechanisms, such as solvent evaporation, chemical reaction, cooling, or sintering. In some cases, the printing fluid is a functional ink, which is a printing fluid that provides a function other than coloration once solidified on the surface on which it is printed. Examples of such functions include electrical conductivity, dielectric properties, physical structure (e.g., stiffness, elasticity, or abrasion resistance), electromagnetic shielding or filtering, optical properties, electroluminescence, etc. The printing surface 12 can be a surface of a printing substrate as shown, or a surface of a previously deposited layer of printing fluid.

The diverter 18 selectively interrupts the stream 20 of printing fluid such that at least some of the extracted printing fluid is not deposited on the printing surface 12. The illustrated diverter 18 includes a diverter nozzle 30 that emits a jet of gas 32 to selectively divert printing fluid from the stream 20 so that the diverted printing fluid is not deposited on the printing surface 12. In this example, the diverter nozzle 30 is located transversely between the nozzle 16 and the extractor 22 such that the jet of gas 32 is aligned with the stream 20 of printing fluid and directed generally parallel with the printing surface 12 (in the direction of the x-axis in FIG. 1) and perpendicular to the directionality field produced by the director nozzle 26. In this case, the jet of gas 28 from the director nozzle 26 intersects the jet of gas 32 from the diverter nozzle 30.

The diverter 18 can be pulsed or otherwise controlled between on and off conditions or high- and low-pressure states to control the printed pattern 14. As shown in FIG. 1, the printed pattern 14 includes discontinuities, each of which corresponds to an "on" condition of the diverter and a diverted portion of the stream 20 of printing fluid. One portion of the printed pattern 14 can thus be made discontinuous while another portion of the printed pattern from an adjacent nozzle 16' is made continuous, even when the same voltage function (V) is applied to both nozzles. Previous e-jet printer technology would require two different voltage functions to be applied to the two nozzles to print different patterns. This has limited multi-nozzle e-jet printing because, when voltage is applied to only one of two adjacent nozzles, the net electrostatic field is different among the multiple nozzles than when voltage is applied to both, resulting in a reduction in deposition accuracy due to the changing net electrostatic field.

The diverted portions of the stream 20 of printing fluid may be diverted toward and/or into a collector 34, as shown in FIG. 1. In this example, the collector 34 is a collection tube with a receiving end aligned with the diverter nozzle 30. An opposite end of the collection tube 34 may be in communication with a vacuum source to assist in collection of the diverted printing fluid. The diverted printing fluid can be collected for reuse or disposal. The collector 34 may be provided in other forms, such as a solid or porous surface to which the diverted printing fluid adheres. It is also possible that the diverter and collector are one and the same with a vacuum-connected tube selectively diverting portions of the stream 20 of printing fluid. In another example, the jet 32 emitted from the diverter nozzle 30 is a jet of liquid. Using a jet of liquid as the diverter fluid can reduce interference with adjacent diverter fluids and with adjacent streams of printing fluid when compared to gaseous diverter fluids because a jet of liquid does not diffuse or disperse as rapidly in the air through which it travels. Liquid jet diversion can also be more precise—i.e., because of the cohesiveness of a liquid jet, a smaller portion of the stream 20 of printing fluid is affected. Other diversion and collection schemes are possible (e.g., electrostatic diversion).

An advantage associated with the elimination of inter-nozzle crosstalk is the ability to space the multiple ink nozzles closer together. Previous attempts at multi-nozzle e-jet printers have required sufficient lateral spacing among adjacent nozzles, for example, to reduce the effects of the multiple independently controlled electrostatic fields on each other. This results in a large print head with relatively large lateral spacing between nozzles. Reference is made to the cross-sectional view of FIG. 2 for further discussion of the multi-nozzle print head 10.

The illustrated print head 10 includes multiple pairs of ink nozzles and director nozzles in an alternating arrangement with extractors, where at least two different ink nozzles share the same extractor. A first pair of ink nozzles includes a first ink nozzle 16 and a second ink nozzle 16', and a second pair of ink nozzles includes a third ink nozzle 116 and a fourth ink nozzle 116'. Each pair of ink nozzles is arranged between a pair of extractors. The first pair of ink nozzles 16, 16' is arranged between a first extractor 22 and a second extractor 22', and the second pair of ink nozzles 116, 116' is arranged between the second extractor 22' and a third extractor 122. One ink nozzle from each pair of ink nozzles thus share an extractor with each other. In this case, the second ink nozzle 16' of the first pair shares the second extractor 22' with the third ink nozzle 116 of the second pair. The second extractor 22' extends between the first and second pairs of ink nozzles and thereby shields each pair of ink nozzles from the other.

The print head 10 further includes a plurality of director nozzles and diverters, with each ink nozzle having an associated director nozzle and diverter. In this case, each ink nozzle has a dedicated director nozzle and a dedicated diverter associated therewith. A first director nozzle 26 is associated with the first ink nozzle 16, a second director nozzle 26' with the second ink nozzle 16', a third director nozzle 126 with the third ink nozzle 116, and a fourth director nozzle 126' with the fourth ink nozzle 116'. Similarly, first, second, third, and fourth diverters 18, 18', 118, 118' are associated with the respective ink nozzles 16, 16', 116, 116'. The director nozzles and diverters may be designated as respective pairs associated with pairs of ink nozzles. For instance, a first pair of director nozzles 26, 26' and a first pair of diverters 18, 18' is associated with the first pair of ink nozzles 16, 16', while a second pair of director nozzles 126, 126' and a second pair of diverters 118, 118' is associated with the second pair of ink nozzles 116, 116'. The associated collectors 34 are not visible in the cross-section of FIG. 2, but are labeled in FIG. 1 with the same numbering convention as the nozzles and diverters.

In this example, all the ink nozzles, director nozzles, and extractors are aligned with their respective axes all arranged in a common y-z plane. This arrangement is only exemplary, as the print head may include additional ink, director, and/or diverter nozzles arranged individually, in pairs, and/or out-of-plane with each other. Additionally, the print head 10 does not require dedicated director nozzles or diverters for each ink nozzle. For example, each pair of director nozzles could be provided in the form of a single director nozzle with an annular discharge opening circumscribing the respective pair of ink nozzles.

Another feature of the illustrated embodiment is the relative directions of extraction of printing fluid from each of the ink nozzles. In particular, the direction of extraction of printing fluid from each nozzle is not necessarily in the same direction. In the illustrated embodiment, respective streams of printing fluid are electrostatically extracted from the first and second nozzles 16, 16' in different first and second directions, for example. The same can be said of the streams of printing fluid extracted from the third and fourth ink nozzles 116, 116'. The different extraction directions are a result of the different orientations of the respective electrostatic extraction fields. In particular, printing fluid from the first nozzle 16 is attracted to the first extractor 22 and printing fluid from the second nozzle 16' is attracted toward the second extractor 22'. The extractors 22, 22' are spaced from the respective ink nozzles 16, 16' in opposite directions (with respect to the y-axis in the figures). This permits the first and second nozzles 16, 16' to be directly adjacent one another and/or to be in physical contact with each other. Further, having a common voltage function (V) applied to the first and second nozzles 16, 16' facilitates their direct adjacency and/or physical contact.

To further enable this relatively close proximity of two different e-jet ink nozzles, the extraction opening 24, 24' of each nozzle may be formed off-axis with the plane of the opening—i.e., non-orthogonal with the central axis of the respective nozzle. In this example, each nozzle 16, 16' is formed with a bevel or chamfer at its distal end. The resulting Taylor cone formed by the printing fluid at the extraction opening 24 is non-symmetric with the longitudinal axis of the nozzle. This configuration, in which the extraction openings 24, 24' of the respective nozzles 16, 16' are facing away from each other, helps prevent attraction of printing fluid from each nozzle toward the wrong extractor and helps prevent printing fluid from the different nozzles from mixing. Other configurations are possible, such as extraction openings formed along the lateral sides of the nozzles or nozzles with curved tips.

Figure 2:
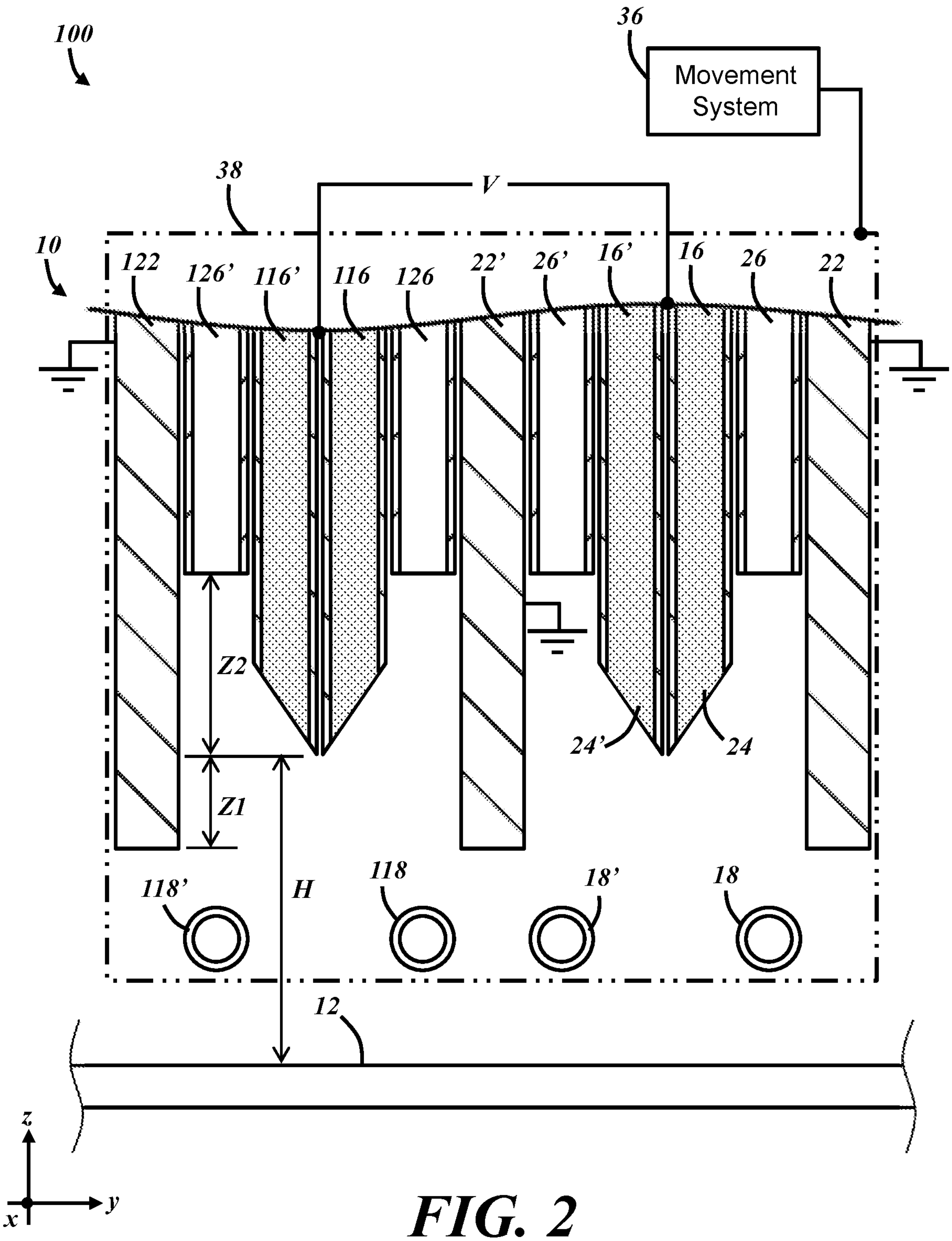
FIG. 2 is a cross-sectional view of the printer of FIG. 1.

While the drawings are not necessarily to scale, some non-limiting dimensions of individual components of the print head 10 are provided below to give a general idea of the size scale of a working embodiment. The print head 10 may be configured to operate at a stand-off height (H) in a range from 5 to 8 millimeters, where the stand-off height is the distance from the extraction end of the ink nozzle 16 to the printing surface 12. Each extractor 22 may extend toward the printing surface and beyond the ends of the ink nozzles 16 by an amount (Z1) in a range from 100 μm to 200 μm such that the extractors are closer to the printing surface 12 than are the ink nozzles. Each ink nozzle 16 may extend toward the printing surface and beyond the ends of the director nozzles 26 by an amount (Z2) in a range from 200 μm to 300 μm such that the ink nozzles are closer to the printing surface 12 than are the director nozzles. The printing fluid is thus extracted from each ink nozzle 16 at a location (along the z-direction in the figures) between a discharge end of the director nozzles 26 and a distal end of the extractors 22. The diverters 18 are located between the ends of the ink nozzles 16 and the printing surface 12 and may be located closer to the printing surface 12 than the extractors 22 as shown in FIG. 2. The collectors 34 (see FIG. 1) are also located between the ends of the ink nozzles 16 and the printing surface 12 and are positioned to capture diverted printing fluid so that it does not reach the printing surface.

As is apparent in the figures, the print head 10 can be made somewhat modular. For example, each of the ink nozzles, director nozzles, diverter nozzles, and extractors may all have a cylindrical configuration with the same or similar outer diameters. For example, the extractors 22 can be made from an electrically conductive rod or wire (e.g., copper) having a diameter in a range from 200 μm to 400 μm or, nominally, 300 μm. Similarly, each ink nozzle 16 can be made from an electrically conductive tube (e.g., copper) having an outer diameter in a range from 200 μm to 400 μm or, nominally, 300 μm. The inner diameter of each ink nozzle 16 may be in a range from 100 μm to 200 μm or, nominally 150 μm. The ink nozzles 16 may also be made from a non-conductive material such as plastic or glass with at least an inner surface of the nozzle plated or otherwise coated with an electrically conductive material such that the printing fluid is charged by the applied voltage (V). The discharge opening of each director nozzle 26 may have a diameter greater than or equal to the diameter of the extraction opening 24 of the corresponding ink nozzle 16.

The director nozzles 26 and the diverter nozzles 30 can be made with the same outer and inner diameters and the ink nozzles 16 but are not required to be electrically conductive. In some cases, it may be preferable that at least the director nozzles 26 are made from an electrical insulator such as glass, plastic, or ceramic to electrically isolate the extractors 22 from the ink nozzles 16. This permits physical contact among adjacent components to help maximize the ink nozzle density—i.e., the number of ink nozzles per square unit of length in a given x-y plane. In other cases, the director nozzles 26 can be formed from an electrically conductive material and operated at the same voltage potential (e.g., ground) as the extractors 22 for improved electrohydrodynamics. In some embodiments the director nozzles 26 are made from metal and electrically insulated from an adjacent ink nozzle 16 and/or an adjacent extractor by a layer of insulating material, such as a polymeric sleeve around at least one of the ink nozzle, extractor, or director nozzle.

The print head 10 may be part of a larger e-jet printer or printing system 100, which may include a movement system 36 configured to provide relative movement between the print head 10 and the printing surface 12 such that the print head can be guided along a deposition pattern or path defined over a printing substrate. Multi-axis movement systems are generally known and may include axis-dedicated servos, guides, wheels, gears, belts, etc. One example of a suitable movement system 36 is disclosed by Barton et al. in U.S. Pat. No. 9,415,590. The movement system 36 may be configured to move the print head 10 back and forth along an axis (e.g., the x-axis) while the printing surface 12 is incrementally fed in a perpendicular direction after each pass of the print head; or the print head 10 can be configured to move in any direction along a plane or three-dimensional contour while the printing surface 12 is held stationary. The print head 10 and/or the printing surface 12 may be configured for relative translational movement in up to all three cartesian coordinate directions, for rotational movement about the associated axes, and for any combination of such movements to allow the print head to deliver printing fluids in any direction and along any path on a substrate of any shape. The print head 10 could be affixed to the end of a robotic arm, for example.

The print head 10 may include a housing 38 in which the illustrated components are at least partly contained. The housing 38 is shown in phantom in FIG. 2. While not shown in detail, skilled artisans will appreciate that fluidic and electrical connections may be provided by the housing 38 to connect the illustrated print head components to fluid and electrical sources outside the housing, including one or more sources of printing fluid, director gas, diverter gas, vacuum, and voltage. The source(s) of printing fluid may have a controllable back pressure which can be brought to zero during printer idle time and into a range from 5 psi to 30 psi (~35-200 kPa) during operation. Back pressure may be individually controllable at each nozzle to accommodate printing of different fluids from each nozzle. The director gas and diverter gas sources may be the same or different, but at least the diverter gas flow is controllable between on and off conditions corresponding to diverting and non-diverting states, respectively. These on and off conditions of the diverters are individually and independently controllable to permit printed patterns from each different nozzle to be different without independent control of the electrostatic extraction of printing fluid from the nozzles. As such, the independently controllable diverters can entirely define the overall printed pattern while the extractors are all operating under the same voltage input to the ink nozzles. In some cases, the director and diverter gases are the same gas (e.g., air, nitrogen, inert gas, etc.) but are supplied from independent sources.

A baseline voltage with respect to the extractors 22 may be maintained at each ink nozzle 16 to maintain a consistent Taylor cone of polarized printing fluid at the extraction opening 24 of each nozzle. When a sufficiently high voltage (V) is applied to any one or more of the nozzles 16, printing fluid is drawn toward the respective extractor 22 and a droplet of printing fluid is released into the directionality field. Exemplary extraction voltage (V) may range from 300V to 1000V, while the baseline voltage at each nozzle 16 is lower than the respective extraction voltage, such as in a range from 10V to 300V. In various embodiments, the baseline voltage at each electrode 24 ranges from 200V to 300V and/or the extraction voltage ranges from 400V to 700V. While the voltage (V) is illustrated as common to all of the ink nozzles, one nozzle may have a higher extraction voltage than another due to various characteristics of the respective printing fluid in each nozzle, such as viscosity, solids content, electrical conductivity, and polarizability, for example. In some embodiments, a pulse function of the voltage at each nozzle is the same with respect to time, but the extraction voltages are different.

Figure 3:
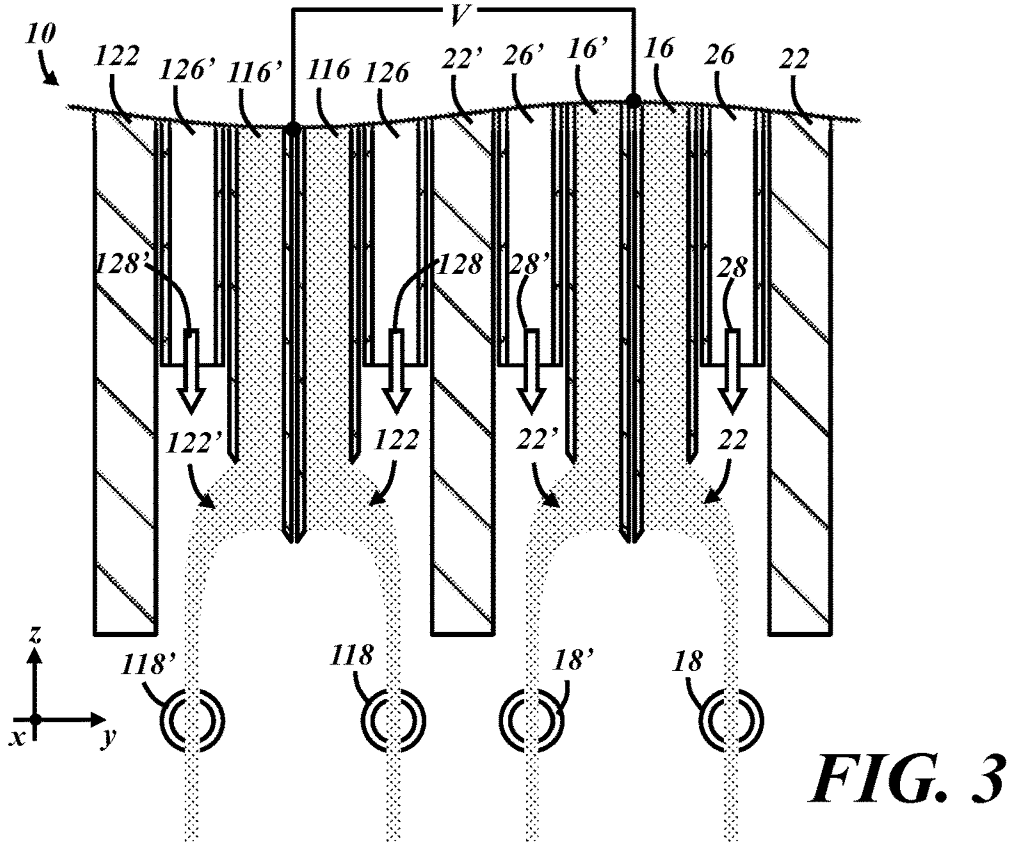
FIG. 3 is the cross-sectional view of FIG. 2 illustrating extracted streams of printing fluid with the diverters in a non-diverting state.
Figure 4:
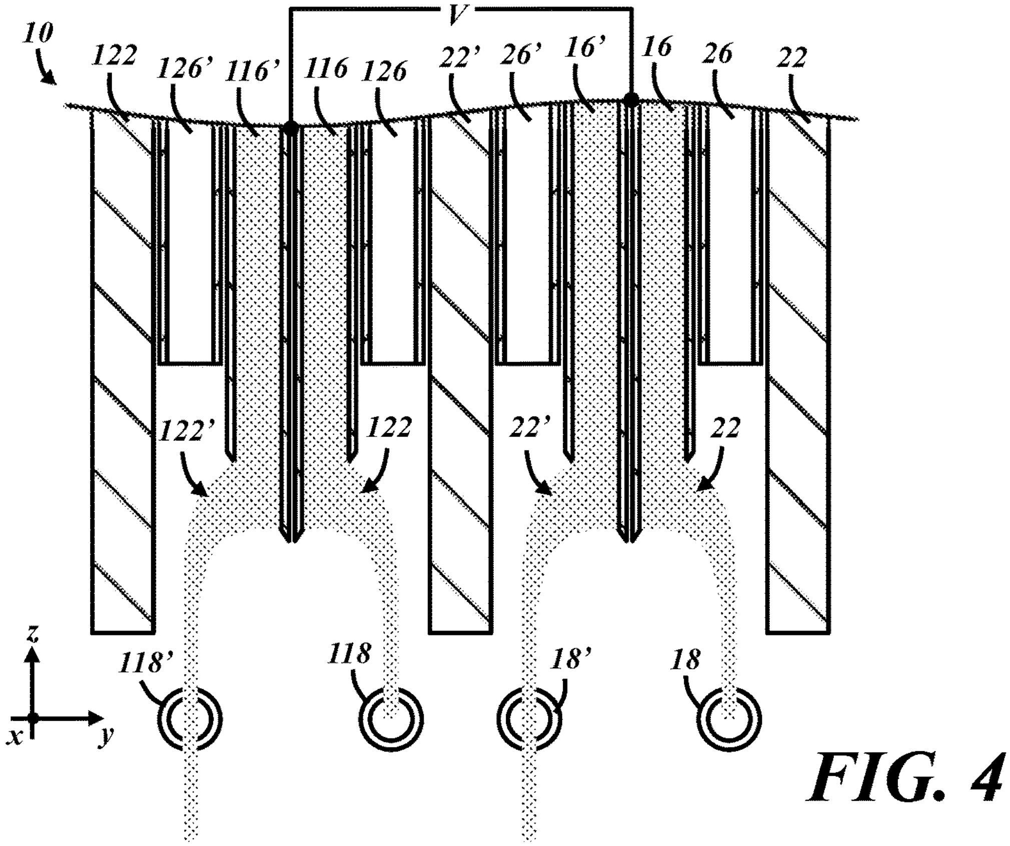
FIG. 4 is the cross-sectional view of FIG. 3 illustrating some of the diverters in a diverting state.

FIGS. 3 and 4 are cross-sectional views of the print head 10 illustrating operation of the diverters. In FIG. 3, first and second streams 20, 20' of printing fluid are being extracted from respective first and second ink nozzles 16, 16' in two different directions toward respective first and second extractors 22, 22' and directed toward the printing surface by jets of gas 28, 28' emitted from the first and second director nozzles 26, 26'. The same is true for third and fourth streams 120, 120' of printing fluid, their respective ink nozzles 116, 116', extractors 22', 122, jets of gas 128, 128', and director nozzles 126, 126'. All of the diverters 18, 18', 118, 118' are in a non-diverting state—i.e., they are not emitting jets of gas and are therefore not diverting any of the extracted printing fluid from any of the streams of printing fluid.

In FIG. 4, the first diverter 18 and the third diverter 118 are in a diverting state—i.e., they are emitting jets of gas in the x-direction (out of the page) and diverting the first and third streams 22, 122 of printing fluid so that those streams of printing fluid are not deposited on the printing surface. Notably, all of the four streams of printing fluid continue to be extracted and directed toward the printing surface even when one or more of the diverters are in the on condition or the diverting state. The net electrostatic field along the face of the print head 10 as a function of time can therefore be held constant, thereby improving printing accuracy and permitting a construction with high ink nozzle density. The diverters are individually controllable and can be used to define the printed pattern, even when extraction and direction of the printing fluid from the multiple nozzles is synchronized. In the illustrated example, discontinuities are formed in the lines of printing associated with the first and third ink nozzles 16, 116 while the diverters are in the states illustrated in FIG. 4.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A printer, comprising: a nozzle from which a stream of printing fluid is electrostatically extracted and directed toward a printing surface, and a diverter that selectively interrupts the stream of printing fluid such that at least some of the extracted printing fluid is not deposited on the printing surface.

2. The printer of claim 1, wherein the diverter uses a jet of fluid to selectively divert printing fluid from the stream so that the diverted printing fluid is not deposited on the printing surface.

3. The printer of claim 1, further comprising a collector into which the extracted and undeposited printing fluid is diverted.

4. The printer of claim 1, further configured to produce intersecting first and second jets of fluid, wherein the first jet directs the stream of printing fluid toward the printing surface and the second jet is provided by the diverter.

5. The printer of claim 1, further comprising:

a director nozzle that provides a first jet of fluid to direct the stream of printing fluid toward the printing surface; and a diverter nozzle that provides a second jet of fluid to selectively divert printing fluid from the stream of printing fluid, wherein the stream of printing fluid is electrostatically extracted at a location between a discharge end of the director nozzle and a discharge end of the diverter nozzle.

6. The printer of claim 1, wherein the nozzle is a first nozzle, the diverter is a first diverter, and the stream of printing fluid is a first stream of printing fluid electrostatically extracted in a first direction toward a first extractor, the printer further comprising:

a second nozzle from which a second stream of printing fluid is electrostatically extracted in a different second direction toward a second extractor and directed toward the printing surface, and a second diverter that selectively interrupts the second stream of printing fluid such that at least some of the printing fluid extracted from the second nozzle is not deposited on the printing surface.

7. The printer of claim 6, wherein the first and second diverters are independently controllable to permit printed patterns from each nozzle to be different without independent control of the electrostatic extraction of printing fluid from the first and second nozzles.

8. The printer of claim 6, wherein the first and second nozzles are located between the first and second extractors with extraction openings of the first and second nozzles facing away from each other.

9. The printer of claim 6, wherein the first and second nozzles are a first pair of nozzles located between the first and second extractors, the printer further comprising a second pair of nozzles located between the second extractor and a third extractor such that one of the nozzles of each pair share the second extractor.

10. The printer of claim 9, wherein the second extractor extends between the first pair and the second pair of nozzles and shields the pairs from each other.

11. The printer of claim 1, wherein the nozzle is an ink nozzle, the printer further comprising:

an extractor transversely spaced apart from the ink nozzle;

a director nozzle between the ink nozzle and the extractor; and a layer of electrically insulating material disposed between the director nozzle and at least one of: the ink nozzle and the extractor.

12. A printer comprising a first nozzle and a second nozzle from which respective streams of printing fluid are electrostatically extracted in different first and second directions and directed toward a printing surface.

13. The printer of claim 12, wherein extraction openings of the first and second nozzles face away from each other.

14. The printer of claim 12, further comprising a first extractor spaced from the first nozzle in the first direction and a second extractor spaced from the second nozzle in the second direction, such that the nozzles are between the extractors.

15. The printer of claim 12, further comprising a diverter that selectively interrupts at least one of the streams of printing fluid such that at least some of the extracted printing fluid is not deposited on the printing surface.

16. The printer of claim 12, further comprising a first diverter that selectively interrupts the stream of printing fluid from the first nozzle and a second diverter that selectively interrupts the stream of printing fluid from the second nozzle such that at least some of the extracted printing fluid is not deposited on the printing surface.

17. The printer of claim 12, further configured to produce intersecting first and second jets of fluid, wherein the first jet directs at least one of the streams of printing fluid toward the printing surface and the second jet diverts printing fluid from one of the streams of printing fluid such that at least some of the extracted printing fluid is not deposited on the printing surface.

18. The printer of claim 12, wherein the first and second nozzles are a first pair of ink nozzles located between first and second extractors, the printer further comprising a second pair of ink nozzles located between the second extractor and a third extractor such that one of the nozzles of each pair share the second extractor.

19. The printer of claim 18, further comprising:

a first pair of director nozzles between the first and second extractor and a second pair of director nozzles between the second and third extractors, wherein the first pair of ink nozzles is between the nozzles of the first pair of director nozzles, and the second pair of ink nozzles is between the nozzles of the second pair of director nozzles; and a first pair of diverter nozzles between the first and second extractor and a second pair of diverter nozzles between the second and third extractors, wherein each diverter nozzle is independently controllable to produce respective jets of fluid to selectively divert printing fluid from each of the respective streams of printing fluid.

20. The printer of claim 12, wherein the nozzles are ink nozzles, the printer further comprising:

an extractor transversely spaced apart from one of the ink nozzles;

a director nozzle between the extractor and the spaced apart ink nozzle; and a layer of electrically insulating material disposed between the director nozzle and at least one of: the spaced apart ink nozzle and the extractor.

* * * * *